E. J. PERRY.

CARBON COPYING MANIFOLD SHEET OR BOOK.

No. 11,547. Reissued June 9, 1896.

Witnesses:
Geo W Young
N. E. Oliphant.

Inventor
Ernest J. Perry
By H. G. Underwood
Attorney

UNITED STATES PATENT OFFICE.

ERNEST J. PERRY, OF FOND DU LAC, WISCONSIN.

CARBON COPYING MANIFOLD SHEET OR BOOK.

SPECIFICATION forming part of Reissued Letters Patent No. 11,547, dated June 9, 1896.

Original No. 541,498, dated June 25, 1895. Application for reissue filed August 3, 1895. Serial No. 558,164.

*To all whom it may concern:*

Be it known that I, ERNEST J. PERRY, a citizen of the United States, and a resident of Fond du Lac, in the county of Fond du Lac and State of Wisconsin, have invented certain new and useful Improvements in Carbon Copying Manifold Sheets or Books; and I do hereby declare that the following is a full, clear, and exact description thereof.

My invention relates especially to manifold receipt and record books for mercantile, railway, express, and other business uses; and it consists in certain peculiar and novel features of construction and arrangement, as hereinafter fully set forth, and subsequently claimed.

Figure 1:
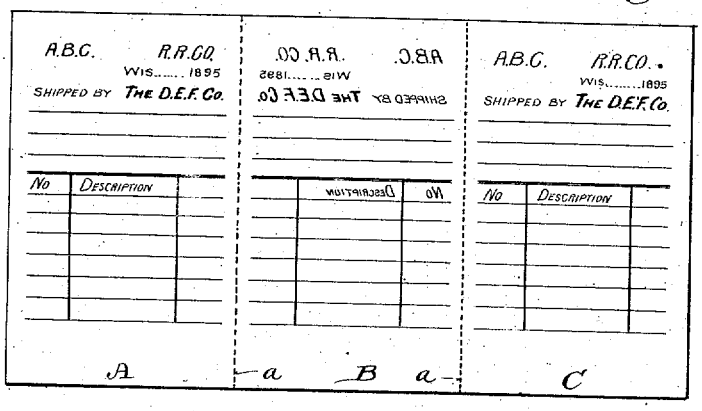
Figure 2:
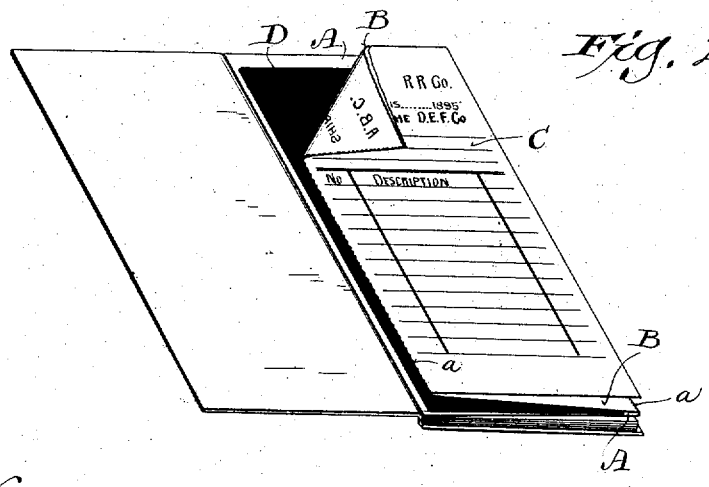

In the drawings, Figure 1 is a plan view of a single sheet embodying one form of my present invention. Fig. 2 is a perspective view of a book formed of a number of said sheets bound together and illustrating the manner of use.

The object of my present invention is the production of a manifold-copying sheet or book of such sheets, so constructed that by the use of a single sheet of carbon-paper interposed between the folds of said sheet a plurality of impressions may be obtained from a single writing, one of which will be upon the portion of said sheet designed to be retained as a permanent record and the balance upon the detachable remainder of said sheet; and a further object of my said invention is to cheapen the cost of manufacturing books and sheets of this general nature.

Referring to the drawings, in Fig. 1 I show the triplicate form of one of my improved sheets, composed of thin transparent paper, divided by rows of perforations or indentations *a a* into three practically equal portions A B C, the parts B and C being of exactly the same width and the part A only differing therefrom by the added width at the left necessary for binding the same into a book of such sheets when desired. These sheets are all printed on the same side, parts A and C being exact duplicates and part B differing therefrom only in that the impression is the reverse from that on the other parts. This is accomplished in this manner: The matter that appears on part A, for example, is set up in the ordinary manner, and from an impression of this matter a "process-block" is obtained (the details of this process forming no part of my present invention) which will print the same matter in an exactly reversed condition. One or more electroblocks of the said original matter are then made in the ordinary manner, it being preferable to make two such blocks, so as not to use the type itself in printing the sheets. The three blocks are then put in a suitable chase with the one that is to make the negative impression between the two that make the positive impressions and spaced an exactly equal distance apart, and then the sheets can be printed in the ordinary manner, a single impression to each sheet being all that is required. These sheets may be used separately or bound into a book, either in the pad or block form or by stitching, as preferred.

In using this form of my device a sheet of carbon D (carbonized on both sides) is placed above the impression on the part A and then the part B is folded down over the same, so that each face of the prepared carbon-sheet is next the printed side of the said parts A and B, and the part C is folded down upon the part B, so that the unprinted surfaces of the parts B C are in contact, and then, with a sharp hard lead-pencil or pen, the date, address, and description of goods, or whatever the desired inscription may be, are written upon the printed surface of the part C and immediately marked thereby upon the printed surfaces of the parts A and B, appearing backward upon the part B and in proper order upon the part A. The parts B and C are then separately detached, as is common in manifold shipping-books and the like, the part A remaining as a permanent record. By reason of the thin transparent paper of which the sheets are made the entire inscription both printed and written will show clearly through the part B from the plain side thereof.

By the use of my invention I avoid the necessity of printing the sheets upon opposite sides thereof, thereby effecting a great saving in the cost of manufacture and am enabled to obtain perfect triplicate copies with the use of a single sheet of carbon-paper.

It is obvious that if desired the described central part B may be printed from speciallymade reversed type, and that all the parts of my sheets may be printed directly from type, though, as stated, it is usually preferred to print from electro or process blocks.

Having thus described my invention, what I claim as new, and desire to secure by Letters Patent, is—

1. A carbon copying manifold sheet consisting of a strip of thin transparent paper divided by transverse perforations or indentations into a plurality of parts, all printed upon the same side and all of said parts bearing the same inscription, but said inscription upon one of said parts appearing in a reversed condition, substantially as set forth.

2. A carbon copying manifold sheet consisting of a strip of thin transparent paper, divided into three practically equal parts divided by transverse rows of perforations or identations and all printed upon the same side, the central part of said sheet bearing the same inscription as that upon the outer parts, but appearing in reversed condition, substantially as set forth.

3. A carbon copying manifold book consisting of a series of sheets of thin transparent paper secured together, and each sheet separable by transverse rows of perforations or indentations into three practically equal parts, all printed upon the same side, the central part of each sheet bearing the same inscription as that upon the outer parts thereof, but appearing in reversed condition, and each sheet folded together with the printed surface of the central part next the printed surface of the part secured to the book, and with the unprinted surface of the central part next the unprinted surface of the free outer or end part of the said sheet, substantially as set forth.

In testimony that I claim the foregoing I have hereunto set my hand, at Fond du Lac, in the county of Fond du Lac and State of Wisconsin, in the presence of two witnesses.

ERNEST J. PERRY.

Witnesses:

C. J. BREITZMAN,

CHARLES HOTALING.